United States Patent [19]

Trindade

[11] 3,889,188

[45] June 10, 1975

[54] TIME ZERO DETERMINATION OF FET RELIABILITY

[75] Inventor: David Charles Trindade, Essex Junction, Vt.

[73] Assignee: International Business Machines Corporation, Armonk, N.Y.

[22] Filed: July 30, 1973

[21] Appl. No.: 383,857

[52] U.S. Cl. .......................... 324/158 T; 324/158 R
[51] Int. Cl. ............................................. G01r 31/22
[58] Field of Search ........ 324/158 T, 158 D, 158 R, 324/73 R

[56] References Cited
OTHER PUBLICATIONS

Harm, R. S.; A Look at Semiconductor Reliability; Solid State Technology; Sept. 1969; pgs. 42–46, 65.
Cooper et al., "Life Testing of . . ."; British Commun. and Electronics; Jan. 1960; pgs. 14–19.

*Primary Examiner*—Alfred E. Smith
*Assistant Examiner*—Ernest F. Karlsen
*Attorney, Agent, or Firm*—Howard J. Walter, Jr.

[57] ABSTRACT

A method for accurately predicting expected failure rates of field effect devices of a particular design for a product being manufactured without extended burn-in or life tests for each device manufactured. The method relies on the determination that there is a specific relationship between the average percentage of devices failing at a high stress applied essentially at time zero and the average percentage of devices failing at a much lower constant stress, for example, in an application environment. The method comprises the steps of determining the average percentage of a first sample of devices which exhibit dielectric breakdown after a short current-limited voltage stress sufficient to cause normally good devices to go into saturation, determining the average percentage of a second sample of devices which exhibit dielectric breakdown after an extended low voltage stress, correlating the percentage of devices exhibiting dielectric breakdown under each stress condition to determine the specific relationship between the percentages and thereafter predicting the percentage of devices expected to exhibit breakdown at an extended period of time by determining the average percentage of devices manufactured under slightly different manufacturing conditions which exhibit breakdown under the short current-limited voltage stress and by applying the specific relationship previously determined. The method enables the effective determination of the results of life tests normally applied at least to statistical samples of devices manufactured to be eliminated except for an initial sample at the beginning of a manufacturing cycle.

10 Claims, 4 Drawing Figures

TIME ZERO DETERMINATION OF FET RELIABILITY

BACKGROUND OF THE INVENTION

1. Field of the Invention

This invention relates to methods of testing semiconductor devices and more particularly, to a method of predicting the ffailure rates of substantially identical field effect devices manufactured under slightly different process conditions.

2. The Prior Art

Semiconductor devices have extremely high reliability since the electronic functions thereof are primarily performed within a solid, and this solid can be expected to retain its initial properties indefinitely, if it is not subjected to conditions beyond its limits. Thus, semiconductor devices are being required to meet reliability levels far in excess of older types of electronic devices. Failure in semiconductor devices, such as field effect transistors, that are observed over a period of time, are principally caused by the sensitivity of these devices to slight imperfections or variations in the manufacturing processes in which submicroscopic effects play so vital a role. These imperfections are so slight that they cannot be detected by the most precise production inspection and show up only as changes in the characteristics of the device over an extended period of time. Therefore it is desirable, and in some instance, necessary, not only to test semiconductor devices for initial satisfactory operating characteristics, but to test them to determine or predict the span of the reliable operating life.

In order to improve the reliability of semiconductor devices, it is necessary to be able to measure reliability itself with reasonable accuracy. In many past and present applications, the failure rates of semiconductor devices are so low that it is impossible to measure actual failure rates under normal operating conditions. The semiconductor industry has turned to stress acceleration testing in order to shorten the time to failure, hopefully, without introducing new failure mechanisms. Most stress, or accelerated, testing techniques known in the art rely on increases in operating temperature to produce failures at an earlier point in time because it is believed that increases in temperature normally will not introduce any failure mechanisms which would not be present under normal operating conditions.

If only a single failure mode is known to be present, and sufficient data relating stress level to time of failure is known, failure rates at expected application conditions may be obtained from a failure acceleration curve. Unfortunately, in the manufacture of semiconductor devices, particularly field effect transistors, not only are many failure modes present, but insufficient data exists to determine the form taken by the failure acceleration curve.

SUMMARY OF THE INVENTION

It is therefore an object of this invention to provide an improvement in the prediction of failure rates for metal oxide semiconductor devices.

It is another object of the invention to reduce the time required to burn-in or eliminate infancy failures in metal oxide semiconductor devices.

The above objects are accomplished by utilizing a time zero test method in conjunction with previously determined constant stress failure rate data for the same type of product in order to standardize the time zero data. Thereafter, reliability and life time predictions for newly manufactured product may be determined solely by the time zero test data for that product. Time zero data may also be utilized as a basis for screening or categorizing production runs of semiconductor devices into various reliability levels. The foregoing and other objects, features, and advantages of the invention will be apparent from the following more particular description of the embodiments of the invention, as illustrated in the accompanying drawings.

DESCRIPTION OF THE PREFERRED EMBODIMENTS

Figure 1:
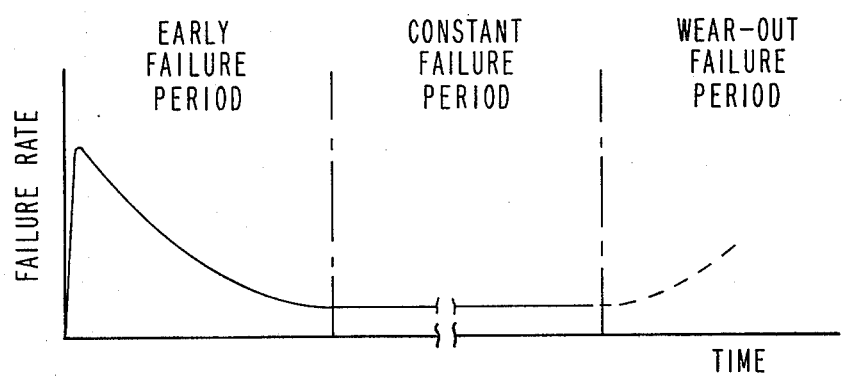
FIG. 1 is a failure rate versus time curve showing three distinct periods representing different failure rates for semiconductor devices.

Referring to FIG. 1 there is shown an idealized failure rate versus time curve based on observation of the life characteristics of many different components. The curve shows the general failure pattern with time. Its shape tends to be independent of failure criteria, operating conditions, or size of the population. The curve is divided into three regions, each having separate failure characteristics. The first region incudes the Early Failure or Infancy Failure Period characteristic of abnormal failure modes caused by variations manufacturing process parameters. This region is most important to the manufacturers of reliable semiconductor devices. The second region represents a Constant Failure Period which determines the useful life of a component, and is sometimes regarded as being comprised of the overlap of the failure rates in the first and third regions. The third region is a Wear-Out Failure Period in which devices fail because of mechanisms inherent in their design. The third region is shown as a dashed line due to the lack of substantial known wear-out mechanisms in semiconductor devices.

Attempts to improve reliability of semiconductor devices are usually concerned with determining, and eliminating, failure modes in the Early Failure Period, which, unfortunately, may be indeterminant in duration for certain time dependent failure mechanisms. The subject invention provides a method for determining failure rates at times corresponding to about the beginning of the Constant Failure Period.

Semiconductor manufacturing experience has proven that, although some relationship exists between device failure rates and applied stress, no previously known testing technique has sufficient confidence to be relied upon as a substitute for actual life tests of devices. Those experienced in reliability testing will appreciate the statement that reliability testing is sometimes more of an art than a science because of the unpredictability of the results obtained from known reliability tests. Although failure rates are expected to follow known statistical distributions, it is well known that even for a simple system involving only a few variables, specific failure rate distribution curves are difficult to identify. For example, in the article by R. G. Stewart, "IEEE Transactions On Reliability," Volume R-15, No. 3, Pages 95–114 (Dec., 1966), no fewer than 12 different types of failure rate distribution curves are described, each being representative of only a single mathematically related family of curves. Theoretical determination of actual failure rate distributions, taking all factors into account, in a manufacturing environment is infinitely difficult. The below described method provides the ability to directly correlate failure rate data for metal oxide semiconductor devices determined in an extremely short period of time with that determined over many thousands of hours.

Figure 2:
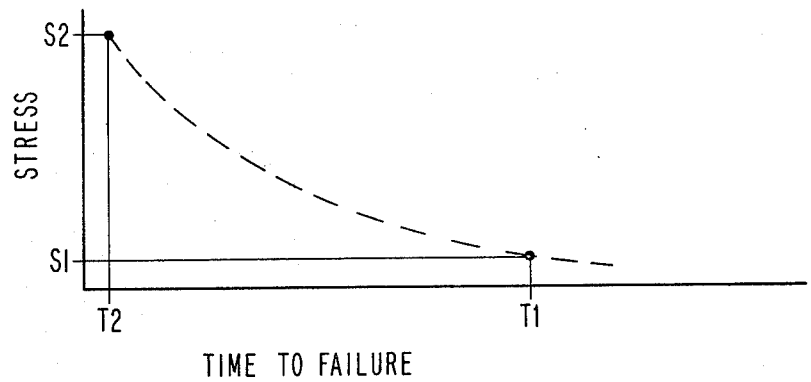
FIG. 2 is a stress versus time to failure plot showing the relationship between different stress levels and times to failure.

Referring now to FIG. 2, there is shown a highly simplified representation of the influence that applied stress has on time-to failure for a time dependent failure mechanism such as might be present in the gate dielectric of a field effect transistor. The dashed line represents the existence of some functional relationship between time-to-failure for different stress levels S1 and S2 at times T1 and T2. If the functional relationship were known it would be a simple matter to extrapolate the curve to any desired point in time. Alternatively, if enough data were available, the curve could be empirically constructed through the use of well-known step-stress testing. Unfortunately, in the semiconductor manufacturing, the results of step-stress testing prove to be so unreliable, or unavailable, that the functional relationship between stress and time to failure is not completely known. Despite the lack of knowledge about the overall functional relationship between accelerated stress failure and normal stress failures the instant invention provides a specific relationship between two different points which has proven to be valid for the same type or product manufactured under substantially the same conditions without knowledge of the intermediate values or the exact overall functional relationship.

Manufacturers of field effect transistors have previously determined that one of the critical portions of a field effect device is the gate oxide region. The method of this invention utilizes the breakdown characteristics of the gate oxide region as an important indicator of overall device reliability.

Figure 3:
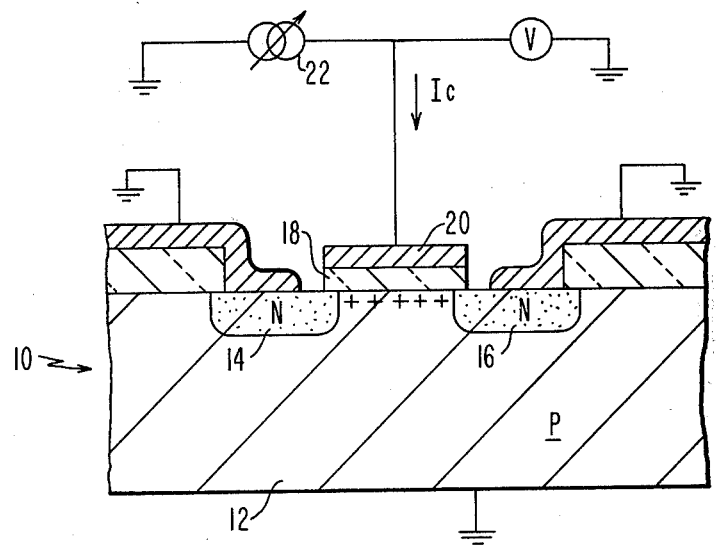
FIG. 3 is a schematic, vertical, sectional view of a field effect transistor showing the voltage requirements for performing the time zero test of the invention.

Referring now to FIG. 3 there is shown the required biasing conditions necessary to determine the time zero failure rate for field effect devices. Field effect transistor 10 comprises a substrate 12 of, for example, p-type semiconductor material, having diffused therein n-type source and drain regions 14 and 16. Located intermediate the source and drain regions, and covered by thin insulating layer 18 of, for example, silicon dioxide, is a channel or gate region. Contacting layer 18 is a conductive gate electrode 20 to which gate potentials are normally applied to modulate the conductivity of the surface of substrate 12. In order to perform the time zero test, a current limited variable voltage source 22 is used to apply a ramp voltage to gate electrode 20. The source and drain regions, as well as the substrate 12, are connected to a common ground potential. For the p-channel device shown, a negative voltage ramp is applied to electrode 20 causing the semiconductor channel region to become heavily accumulated. If the gate insulator 18 is defective or subject to time dependent stress failure mechanisms, it will break down in a very short period of time, causing an electrical short between gate electrode 20 and substrate 12. On the other hand, if the insulator is free of defects, the semiconductor surface will saturate by sustaining the constant current Ic provided by current limited voltage source 22. The value of Ic is determined by specific product specifications and should prevent a field in excess of that required to produce dielectric breakdown in the insulator from being applied. For example, for a field effect transistor having a thermally grown silicon dioxide gate dielectric of about 650 Angstrom units in thickness, Ic should be about 10 nanoamps which can be applied, for example, using a Keithley 610C electrometer as a current limited voltage source. This current results in a saturation voltage of about −53 volts.

In a semiconductor manufacturing environment, it is usually not possible to test the gate dielectric of devices in an actual integrated circuit. It is therefore preferred to utilize special test structures in the kerf area of product carrying semiconductor wafers. Because the number of actual failures may be extremely low, it is also preferable to use chains of metal-oxide-semiconductor capacitor structures which have about 100 gates connected in parallel. It has been determined by others that the statistical results obtained by using chains of very low failure rate devices is statistically equivalent to the results obtained with individual elements. This relationship exists even though the first device to fail in a single chain effectively eliminates the remainder of devices in that chain from test.

The above described time zero gate dielectric stress test is used to predict the expected percentage of devices that will fail at the end of an extended period of time by the following method.

Gate breakdown and saturation voltages are obtained from a portion of kerf capacitors or gate chains on the same semiconductor wafers from which functional product is to be made. A percentage of gate failures, or breakdowns, is calculated for each wafer. Averaging several wafers from the same production lot establishes average percentage breakdown per lot. The time zero breakdown test is carried out as described above by forcing a current limited voltage through the dielectric to produce either breakdown or saturation. At saturation, the applied voltage is sustained for about 2 to 10 seconds. The product wafers, including test structures, are then subjected to normal extended reliability testing. The extended testing may include stressing the gate dielectric at a substantially lower electrical stress at an elevated temperature. A determination of the average percentage of gate breakdowns at the lower stress is made. The results of both time zero and constant stress tests are correlated on semilogarithmic graph paper to determine the specific relationship between the two test results. Once the correlation has been made, reliability results to be expected at the extended period of time are made on additional manufactured lots of semiconductor product by making only the time zero test and by applying the predetermined relationship to the results. If the extended constant stress breakdown data corresponds to actual field failure rates, lifetime predictions for currently manufactured product can be determined. On the other hand, if the relationship between a constant stress acceleration test results and field failure rate is already known, field failure rates can be predicted by converting time zero test data to the constant stress acceleration test conditions and thereafter applying the known field failure relationship to determine expected field failure rates.

The following example illustrates the results of a specific application of the time zero test.

Figure 4:
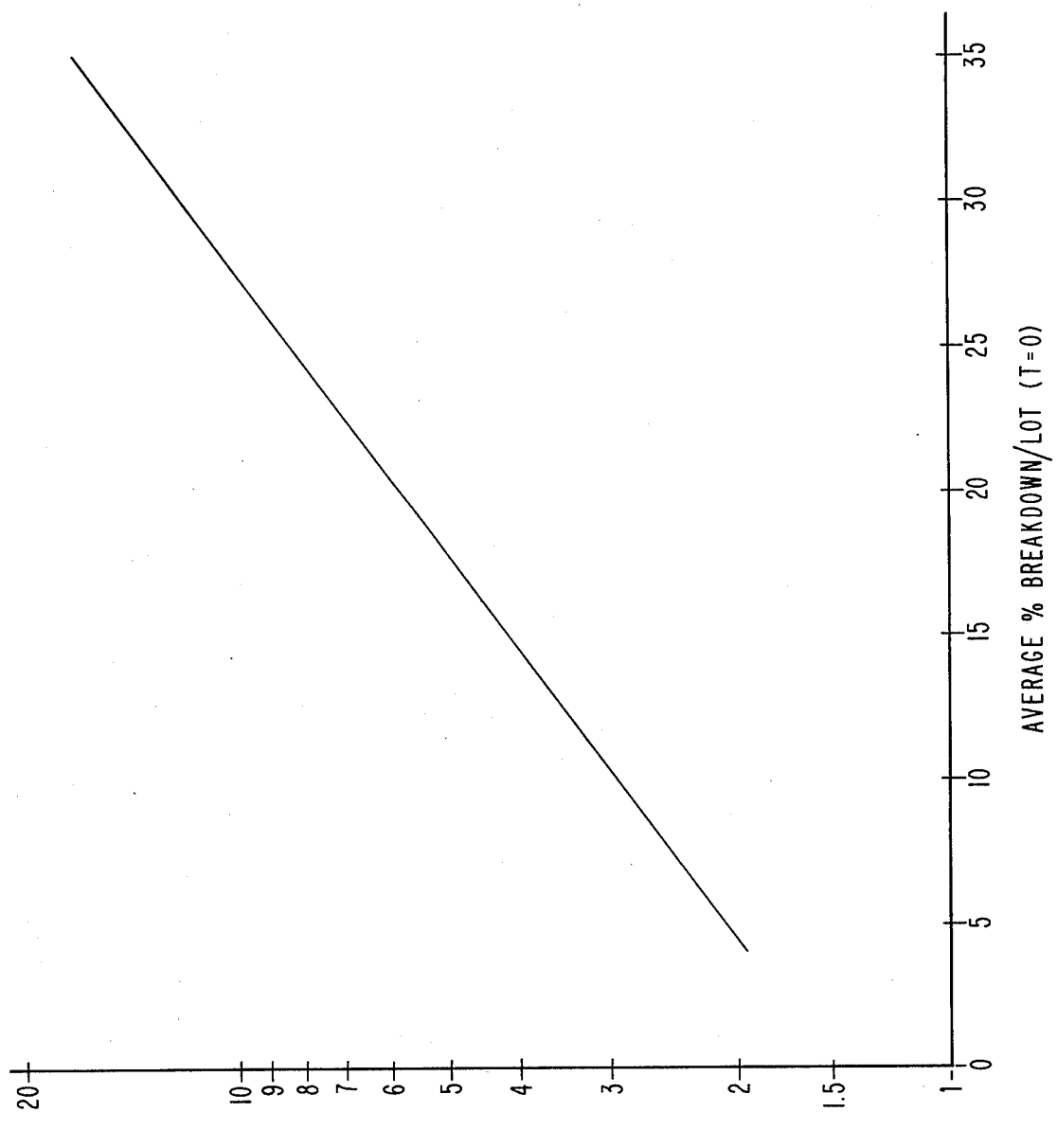
FIG. 4 is a representative plot of constant stress failure rate versus average percent breakdown at time zero illustrating the correlation between such data.

Two lots of field effect transistor product were characterized at time zero by the method described. Twenty-four kerf capacitors per wafer were measured. The first lot consisted of 20 wafers and the second 9. The average percent breakdown for the first lot was 4 percent and for the second lot was 29 percent. Product made from the wafers was then exposed to an extended stress acceleration test which consisted of applying about 17 volts to the gate electrode of the test structures maintained at an elevated temperature of about 140°C for a period of time in excess of several hundred hours. FIG. 4 shows the relationship between the time zero data and the constant stress results. As can be seen in FIG. 4, the lot that experienced a 4 percent average breakdown at time zero corresponds to about 2 percent defective devices at the end of the constant stress acceleration test. The existence specific relationship shown in FIG. 4 has been verified by subsequent experiments.

As will be appreciated by those skilled in the art, the above described method provides a technique for quickly determining the reliability of currently manufactured product once the initial correlation to extended test results has been established.

It is preferred to perform the extended constant stress accelertion tests for each different product to be manufactured, as significant variations in processing or structure may result in a different relationship between time zero and extended test results due to previously unrecognized failure mechanisms introduced.

While the invention has been particularly shown and described with reference to a preferred embodiment thereof it will be understood by those skilled in the art that the foregoing and other changes in form and details may be made therein without departing from the spirit and scope of the invention.

What is claimed is:
1. The method for predicting the failure rate of metal-insulator-semiconductor devices caused by variations in manufacturing process parameters, comprising the steps of:
  A. applying for a relatively short period of time, a first current limited voltage across the insulator of a first portion of a group of substantially identical metal-insulator-semiconductor devices, said voltage having a magnitude substantially equal to the saturation voltage of said semiconductor device;
  B. determining the average percentage of said first portion of said devices which exhibit metal-to-semiconductor voltage breakdown under said first voltage at the end of said short period of time;
  C. applying for an extended period of time a second voltage across the insulator of at least a second portion of said group of devices, said second voltage having a magnitude substantially lower than said first voltage;
  D. determining the average percentage of said second portion of said devices which exhibit metal-to-semiconductor voltage breakdown under said second voltage at the end of said extended period of time;
  E. correlating the percentage of devices exhibiting voltage breakdown in said short and extended periods of time to determine the specific relationship between said percentages; and
  F. predicting the average percentage of devices expected to exhibit voltage-to-semiconductor breakdown at said extended period of time for a different group of metal-insulator-semiconductor devices manufactured under different manufacturing process parameters by determining the average percentage of at least a portion of said different group of devices exhibiting voltage breakdown after applying said first voltage for said relatively short period of time and determining the expected average percentage of devices to exhibit breakdown at said extended period of time by applying the specific relationship determined in step E to said average percentage of devices exhibiting voltage breakdown in said portion of said group of different devices.

2. The method of claim 1 wherein said metal-insulator-semiconductor devices comprise test structures on semiconductor substrates containing field effect transistor integrated circuits.

3. The method of claim 2 wherein said test structures comprise a plurality of capacitors connected in electrical parallel.

4. The method of claim 1 wherein said extended period of time is in excess of one hundred hours.

5. The method of claim 1 wherein step C comprises field test of said second portion of said devices in an application environment.

6. The method of claim 1 wherein said short period of time is about two to ten seconds in duration.

7. The method of determining at the time of manufacture the future expected percentage of gate dielectric failures of insulated gagte field effect devices of the same type as those having a known percentage of gate dielectric failures as determined from an extended constant stress test performed on previously manufactured devices, comprising the steps of:
  A. electrically stressing for a short period of time the gate dielectric of a plurality of recently manufactured devices with a current limited voltage having a magnitude substantially equal to the saturation voltage capable of being sustained by the gate dielectric of said devices;
  B. determining the average percentage of said recently manufactured devices exhibiting gate dielectric breakdown after said short period of time;
  C. correlating the average percentage of devices exhibiting breakdown with said known percentage of gate dielectric failures to determine the specific relationship between said percentages;
  D. manufacturing an additional plurality of devices of the same type as previously manufactured;
  E. determining the average percentage of gate dielectric breakdowns of at least a portion of said additional plurality of devices after the application of the conditions of step A; and
  F. determining the expected future percentage of gate dielectric failures by applying said specific relationship determined in step C to the average percentage determined in step E.

8. The method of claim 7 wherein said short period of time is about two to ten seconds in duration.

9. The method of claim 7 wherein said known percentage of gate dielectric failures is determined by an accelerated test of duration in excess of one hundred hours.

10. The method of claim 9 wherein said accelerated test includes temperature stressing.

* * * * *